United States Patent
Aikawa et al.

(10) Patent No.: US 6,937,805 B2
(45) Date of Patent: *Aug. 30, 2005

(54) DISPERSION COMPENSATING FIBER AND DISPERSION COMPENSATING FIBER MODULE

(75) Inventors: Kazuhiko Aikawa, Sakura (JP); Shogo Shimizu, Sakura (JP); Takaaki Suzuki, Sakura (JP); Ryuji Suzuki, Sakura (JP); Masakazu Nakayama, Sakura (JP); Kuniharu Himeno, Sakura (JP)

(73) Assignee: Fujikura, Ltd., Tokyo (JP)

( * ) Notice: Subject to any disclaimer, the term of this patent is extended or adjusted under 35 U.S.C. 154(b) by 179 days.

This patent is subject to a terminal disclaimer.

(21) Appl. No.: 10/270,569

(22) Filed: Oct. 16, 2002

(65) Prior Publication Data

US 2003/0095769 A1 May 22, 2003

(30) Foreign Application Priority Data

Oct. 26, 2001 (JP) .................................. P2001-329740
Dec. 26, 2001 (JP) .................................. P2001-392982

(51) Int. Cl.$^7$ ............................ G02B 6/16; G02B 6/18; G02B 6/20; G02B 6/22
(52) U.S. Cl. ........................ 385/123; 385/124; 385/125; 385/126; 385/127; 385/128
(58) Field of Search ................................ 385/123, 124, 385/125, 126, 127, 128

(56) References Cited

U.S. PATENT DOCUMENTS

| | | | |
|---|---|---|---|
| 5,361,319 A | 11/1994 | Antos et al. | 385/123 |
| 5,838,867 A | 11/1998 | Onishi et al. | 385/123 |
| 5,995,695 A | * 11/1999 | Aikawa et al. | 385/123 |

(Continued)

FOREIGN PATENT DOCUMENTS

| | | |
|---|---|---|
| EP | 0 864 889 | 9/1998 |
| EP | 1 130 428 A1 | 9/2001 |
| EP | 1 130 428 | 9/2001 |
| JP | 6-11620 | 1/1994 |
| JP | 2000-47048 | 2/2000 |
| JP | 2000-162462 | 6/2000 |
| WO | WO 98/04941 | 2/1998 |
| WO | WO 01/71391 | 9/2001 |

OTHER PUBLICATIONS

Gruener–Nilsen, Lars et al.; "Design and manufacture of dispersion compensating fibre for simultaneous compensation of dispersion and dispersion slope," Optical Fiber Communication Conference, Feb. 24, 1999, pp. 232–234.

(Continued)

Primary Examiner—Frank G. Font
Assistant Examiner—Mary El-Shammaa
(74) Attorney, Agent, or Firm—Blank Rome, LLP

(57) ABSTRACT

A dispersion compensating fiber, which has a negative dispersion slope with a large absolute value while maintaining the absolute value of the chromatic dispersion, and which has sufficient dispersion slope compensation properties even for the non-zero dispersion shifted optical fiber requiring a large RDS for dispersion compensation. In this dispersion compensating fiber, the radius of a ring core region is set in a range from 6.7 μm to 10.7 μm, the radius ratio of a depressed core region relative to a central core region is set in a range from 2.0 to 3.0, and the radius ratio of the ring core region relative to the depressed core region is set in a range from 1.3 to 2.0, the relative refractive index difference of the central core region relative to the cladding is set in a range from +1.00% to +1.80%, the relative refractive index difference of the depressed core region relative to the cladding is set in a range from –1.20% to –1.50%, and the relative refractive index difference of the ring core region relative to the cladding is set in a range from +0.20% to +0.50%.

41 Claims, 1 Drawing Sheet

U.S. PATENT DOCUMENTS

| | | | |
|---|---|---|---|
| 6,009,221 A | 12/1999 | Tsuda | 385/123 |
| 6,263,138 B1 | 7/2001 | Sillard et al. | 385/123 |
| 6,519,402 B2 * | 2/2003 | Aikawa et al. | 385/124 |
| 6,587,627 B2 * | 7/2003 | Saitou et al. | 385/127 |
| 6,671,445 B2 * | 12/2003 | Bickham et al. | 385/127 |
| 6,701,052 B2 * | 3/2004 | Berkey et al. | 385/126 |
| 2001/0033724 A1 | 10/2001 | Kato et al. | |
| 2002/0028051 A1 * | 3/2002 | Bickham et al. | 385/123 |
| 2002/0097969 A1 * | 7/2002 | Aikawa et al. | 385/123 |
| 2002/0164139 A1 * | 11/2002 | Saitou et al. | 385/127 |
| 2003/0007760 A1 * | 1/2003 | Goyal et al. | 385/123 |
| 2003/0021563 A1 * | 1/2003 | Jiang et al. | 385/123 |
| 2003/0049006 A1 * | 3/2003 | Aikawa et al. | 385/128 |
| 2003/0095766 A1 * | 5/2003 | Aikawa et al. | 385/123 |
| 2003/0215201 A1 * | 11/2003 | Tanigawa et al. | 385/123 |
| 2003/0215202 A1 * | 11/2003 | Tanigawa et al. | 385/123 |
| 2004/0028363 A1 * | 2/2004 | Tanigawa et al. | 385/123 |

OTHER PUBLICATIONS

Berkey, G.E. et al.; "Negative Slope Dispersion Compensating Fibers," Optical Fiber Communication Conference, Feb. 24, 1999, pp. 235–237.

Quang, Le N.T. et al.; "New dispersion compensating module for compensation of dispersion and dispersion slope of non–zero dispersion fibres in the C–band," Optical Fiber Communication Conference, Mar. 20, 2001, pp. TuH5–1–TuH5–3.

Kato, T. et al.; "Design optimization of dispersion compensating fiber for NZ–DSF considering nonlinearity and packaging performance," Optical Fiber Communication Conference, Mar. 20, 2001, pp. TuS6–1–TuS6–3.

Li, M.J.; "Recent Progress in Fiber Dispersion Compensators," Proc. $27^{th}$ Eur. Conf. On Opt. Comm. (ECOC'01—Amsterdam), pp. 486–489.

Cohen, L. G., et al., "Low–Loss Quadruple–Clad Single–Mode Lightguides with Dispersion Below 2 ps/km nm Over the 1.2 μm–1.2 μm Wavelength Range." Electronics Letters, IEE Slevenage, GB Vo. 18, no. 24, Nov. 25, 1982, pp. 1023–1024.

Chinese Office Action CPEL0253923 dated Aug. 20, 2004 w/English translation.

* cited by examiner

DISPERSION COMPENSATING FIBER AND DISPERSION COMPENSATING FIBER MODULE

BACKGROUND OF THE INVENTION

1. Field of the Invention

This invention relates to dispersion compensating fibers and to dispersion compensating fiber modules, and specifically relates to dispersion compensating fibers and to dispersion compensating fiber modules which are used to compensate dispersion in a non-zero dispersion shifted optical fiber having a chromatic dispersion of approximately a few ps/nm/km in the 1.55 $\mu$m band.

2. Background Art

As erbium doped optical amplifiers have become available, communication systems, specifically, using the 1.53–1.63 $\mu$m wavelength band, such as an ultra-long-haul non-regenerative repeater system, which utilize optical amplifiers, have been commercialized. On the other hand, as an increased transmission capacity is required, the wavelength division multiplexing transmission technology has been rapidly developed, and some transmission paths installed for this purpose have been commercialized. In the technical trend in the near future, expanding of the operating wavelength band and increasing of wavelength multiplicity will rapidly progress.

Assuming that signals should be rapidly transmitted through transmission paths, these transmission paths should preferably be optical fibers which have less chromatic dispersion in the transmission band, and which do not have zero dispersion wavelength in the operating wavelength in order to suppress nonlinearity. In addition, it is important specifically for the wavelength division multiplexing transmission systems that the gain difference between the wavelengths due to the erbium-doped optical fiber amplifier, be minimized in the operating wavelength band, and be somewhat small dispersion, and that the change ratio of the dispersion in accordance with the change in wavelength (hereinafter referred to as dispersion slope) in the entire transmission paths be kept low in order to suppress dispersion differences between the wavelengths due to the dispersion slope, and to suppress dispersion differences among the wavelengths in the operating wavelength band as much as possible.

Furthermore, because the wavelength multiplicity is greatly increased and the power of the light being transmitted through optical fibers is also greatly increased in recent long-haul transmission systems, it is essential to use a technique suppressing nonlinearity which may degrade transmission properties.

The magnitude of nonlinearity is represented by $n_2/A_{\mathit{eff}}$, where $n_2$ is a non-linear refractive index of the optical fiber, and $A_{\mathit{eff}}$ is an effective area of the optical fiber. In order to suppress the nonlinearity, $n_2$ should be reduced or $A_{\mathit{eff}}$ should be increased; however, it is difficult to greatly reduce $n_2$ in the case of silica based optical fiber because $n_2$ is inherent in the material forming the optical fiber. Accordingly, the current development of nonlinearity suppressing optical fibers is focused on increasing the $A_{\mathit{eff}}$ of the optical fiber.

Various kinds of non-zero dispersion shifted optical fibers (hereinafter abbreviated as NZ-DSF) having a chromatic dispersion of approximately a few ps/nm/km in the operating wavelength band, in which the zero-dispersion wavelength is slightly shifted from the operating wavelength band, have been installed all over the world, as well as standard single-mode optical fiber with zero-dispersion wavelength in the 1.3 $\mu$m band (hereinafter abbreviated as S-SMF) networks, and it is predicted that more such NZ-DSFs will be installed in the future. Because the chromatic dispersion of such optical fibers are suppressed to approximately +4 ps/nm/km in the 1.55 $\mu$m band, these optical fibers may be installed without compensating chromatic dispersion for longer distances than in the case of the S-SMF. When these optical fibers are used for signal transmission at a transmission rate of 10 Gb/s, the upper limit of the transmission distance due to residual dispersion is approximately 200–300 km.

Therefore, dispersion compensating fibers for compensating chromatic dispersion of the NZ-DSFs are being developed as well as dispersion compensating fibers for the S-SMF. Because these dispersion compensating fibers have a large negative dispersion and a large negative dispersion slope in the operating wavelength band due to the controlled refractive index profile, it is possible to compensate positive dispersion, generated in the S-SMF and the NZ-DSFs, over a broad wavelength range by connecting the dispersion compensating fibers having appropriate length with the transmission optical fibers, whereby a high speed transmission can be realized.

Because the NZ-DSF has less chromatic dispersion in the operating wavelength band than in the case of S-SMF, the ratio of dispersion slope of the dispersion compensating fiber for the NZ-DSF relative to chromatic dispersion to be compensated, i.e., relative dispersion slope (hereinafter abbreviated as RDS), is generally high, which makes it difficult to manufacture the dispersion compensating fiber for the NZ-DSF.

In the case of S-SMF whose dispersion properties in the 1.55 $\mu$m band are such that the chromatic dispersion is about +17 ps/nm/km, and the dispersion slope is about +0.058 ps/nm$^2$/km, the RDS required in the dispersion compensating fiber for the S-SMF is approximately 0.0034 nm$^{-1}$. On the other hand, in the case of NZ-DSF, whose dispersion properties are such that the chromatic dispersion is about +4.5 ps/nm/km, and the dispersion slope is about +0.045 to +0.090 ps/nm$^2$/km, the RDS required in the dispersion compensating fiber for the NZ-DSF is approximately as large as 0.01 nm$^{-1}$ to 0.02 nm$^{-1}$; therefore, the absolute value of the negative dispersion slope in the dispersion compensating fiber must be set to be large. Specifically in the case of NZ-DSF having a large effective area among NZ-DSFs, whose dispersion properties are such that the chromatic dispersion is about +4.5 ps/nm/km, and the dispersion slope is about +0.090 ps/nm$^2$/km, the RDS required in the dispersion compensating fiber for the NZ-DSF is approximately 0.02 nm$^{-1}$, which is as large as six times the RDS required in the dispersion compensating fiber for the S-SMF. Accordingly, the absolute value of the negative dispersion slope in the dispersion compensating fiber must be set to be large.

In the past, some documents describing examples of such dispersion compensating fibers have been published. For example, U.S. Pat. No. 5,838,867 discloses an invention of a dispersion compensating fiber in which the RDS is set in a range from 0.010 to 0.013 nm$^{-1}$ for the chromatic dispersion ranging from 0 to −40 ps/nm/km. Furthermore, U.S. Pat. No. 6,263,138 discloses an invention of a dispersion compensating fiber in which the RDS is set in a range from 0.0067 to 0.0069 nm$^{-1}$ for the chromatic dispersion ranging below −40 ps/nm/km.

Although, these documents recognize that the preferable range for the RDS is a range greater than 0.007 nm$^{-1}$, none of them discloses a manufacturing method for a dispersion compensating fiber whose RDS is set more than 0.007 nm$^{-1}$, where the chromatic dispersion ranges from −50 to −130 ps/nm/km, and whose RDS is set in a range from 0.016 to 0.024 nm$^{-1}$, where the chromatic dispersion ranges from −20 to −140 ps/nm/km.

Therefore, it could hardly be possible to completely compensate the dispersion slope in the optical transmission path consisting of the NZ-DSFs using the above disclosed dispersion compensating fibers, and a large residual dispersion remains at the ends of the optical transmission path. As a result, further dispersion compensation is required in order to realize a high speed transmission; however, the transmission properties may be degraded due to a large transmission loss.

SUMMARY OF THE INVENTION

Based on the above problems, an object of the present invention is to provide a dispersion compensating fiber which has a negative dispersion slope with a large absolute value while maintaining the absolute value of the chromatic dispersion to be greater than the conventional value; which has sufficient dispersion compensation properties for the NZ-DSF requiring a large RDS for dispersion compensation, and to further provide a dispersion compensating fiber module which may be compact.

In order to achieve the above object, a first aspect of the present invention provides a dispersion compensating fiber, comprising: a cladding; a central core region having a higher refractive index than that of the cladding; a depressed core region which is located around the central core region, and which has a lower refractive index than that of the cladding; and a ring core region which is located around the depressed core region and inside the cladding, and which has a higher refractive index than that of the cladding, wherein, the radius of the ring core region is set in a range from 6.5 μm to 9.5 μm, the radius ratio of the depressed core region relative to the central core region is set in a range from 2.0 to 4.0, and the radius ratio of the ring core region relative to the depressed core region is set in a range from 1.1 to 2.0, wherein the relative refractive index difference of the central core region relative to the cladding is set in a range from +1.00% to +1.90%, the relative refractive index difference of the depressed core region relative to the cladding is set in a range from −0.60% to −1.00%, and the relative refractive index difference of the ring core region relative to the cladding is set in a range from +0.20% to +1.00%, and wherein at at least one wavelength selected from the range from 1.53 μm to 1.63 μm, chromatic dispersion of the dispersion compensating fiber is in a range from −50 ps/nm/km to −150 ps/nm/km, the dispersion slope is in a range from −0.25 ps/nm$^2$/km to −3.0 ps/nm$^2$/km, the ratio of the dispersion slope relative to the chromatic dispersion is in a range from 0.005 nm$^{-1}$ to 0.020 nm$^{-1}$, and the dispersion compensating fiber has a cut-off wavelength which substantially enables single mode transmission.

A second aspect of the present invention provides a dispersion compensating fiber, comprising: a cladding; a central core region having a higher refractive index than that of the cladding; a depressed core region which is located around the central core region, and which has a lower refractive index than that of the cladding; and a ring core region which is located around the depressed core region and inside the cladding, and which has a higher refractive index than that of the cladding, wherein, the radius of the ring core region is set in a range from 6.5 μm to 9.5 μm, the radius ratio of the depressed core region relative to the central core region is set in a range from 2.0 to 3.5, and the radius ratio of the ring core region relative to the depressed core region is set in a range from 1.1 to 1.5, wherein the relative refractive index difference of the central core region relative to the cladding is set in a range from +1.30% to +1.80%, the relative refractive index difference of the depressed core region relative to the cladding is set in a range from −0.68% to −0.75%, and the relative refractive index difference of the ring core region relative to the cladding is set in a range from +0.30% to +0.6%, and wherein at at least one wavelength selected from the range from 1.53 μm to 1.63 μm, chromatic dispersion of the dispersion compensating fiber is in a range from −50 ps/nm/km to −100 ps/nm/km, the dispersion slope is in a range from −0.25 ps/nm$^2$/km to −2.0 ps/nm$^2$/km, the ratio of the dispersion slope relative to the chromatic dispersion is in a range from 0.005 nm$^{-1}$ to 0.020 nm$^{-1}$, and the dispersion compensating fiber has a cut-off wavelength which substantially enables single mode transmission.

In the above dispersion compensating fiber, the transmission loss may preferably be equal to or less than 0.5 dB/km, and the bending loss at a diameter of 20 mm at the longest wavelength in the wavelength band selected from 1.53 μm to 1.63 μm may be equal to or less than 100 dB/m.

The transmission loss may preferably be equal to or less than 0.5 dB/km, and the bending loss at a diameter of 20 mm at the longest wavelength in the wavelength band selected from 1.53 μm to 1.63 μm may be equal to or less than 20 dB/m.

In the above dispersion compensating fiber, at at least one wavelength selected from the range from 1.53 μm to 1.63 μm, the ratio of the dispersion slope relative to the chromatic dispersion may preferably be in a range from 0.010 nm$^{-1}$ to 0.020 nm$^{-1}$, the dispersion compensating fiber may have a cut-off wavelength which substantially enables single mode transmission, the transmission loss may be equal to or less than 0.5 dB/km, and the bending loss at a diameter of 20 mm at the longest wavelength in the wavelength band selected from 1.53 μm to 1.63 μm may be equal to or less than 100 dB/m.

The dispersion compensating fiber may further comprises a layer which is located between the ring core region and the cladding, and which has a lower refractive index than that of the cladding.

The present invention also provides a dispersion compensating fiber module comprising any one of the above dispersion compensating fibers.

A further object of the present invention is to provide a dispersion compensating fiber which has a negative dispersion slope with a large absolute value while maintaining the absolute value of the chromatic dispersion at the conventional level; which has sufficient dispersion compensation properties for the NZ-DSF requiring a large RDS for dispersion compensation; in which transmission loss is minimized; and which can be wound around a small reel to form a compact module without increasing transmission loss, and to further provide a dispersion compensating fiber module which may be compact.

In order to achieve the above objects, a third aspect of the present invention provides a dispersion compensating fiber, comprising: a cladding; a central core region having a higher refractive index than that of the cladding; a depressed core region which is located around the central core region, and which has a lower refractive index than that of the cladding; and a ring core region which is located around the depressed core region and inside the cladding, and which has a higher refractive index than that of the cladding, wherein, the radius of the ring core region is set in a range from 6.7 μm to 10.7 μm, the radius ratio of the depressed core region relative to the central core region is set in a range from 2.0 to 3.0, and the radius ratio of the ring core region relative to the depressed core region is set in a range from 1.3 to 2.0, wherein the relative refractive index difference of the central core region relative to the cladding is set in a range from +1.00% to +1.80%, the relative refractive index difference of the depressed core region relative to the cladding is set in a range from −1.20% to −1.50%, and the relative refractive index difference of the ring core region relative to the cladding is set in a range from +0.20% to +0.50%, and wherein at least one wavelength selected from the range from 1.53 μm to 1.57 μm, chromatic dispersion of the dispersion compensating fiber is in a range from −20 ps/nm/km to −140 ps/nm/km, the ratio of the dispersion slope relative to the chromatic dispersion is in a range from 0.016 $nm^{-1}$ to 0.024 $nm^{-1}$, and the dispersion compensating fiber has a cut-off wavelength which substantially enables single mode transmission at a use length when it is used in a wound state.

In the dispersion compensating fiber having above features, the RDS ranging from 0.016 $nm^{-1}$ to 0.024 $nm^{-1}$ could be obtained even though the absolute value of the chromatic dispersion is relatively large.

Therefore, dispersion compensating fiber having a large RDS can thus be obtained. This dispersion compensating fiber can effectively compensate the dispersion slope even for the NZ-DSF having the chromatic dispersion of about +4.5 ps/nm/km and the dispersion slope of about +0.09 $ps/nm^2/km$ in the 1.55 μm band.

Accordingly, it is possible to compensate the residual chromatic dispersion over a broad wavelength range, whereby transmission rate may be increased, and high speed optical transmission paths in which the transmission rate is, for example, 40 Gb/s can be constructed.

A fourth aspect of the present invention provides a dispersion compensating fiber, comprising: a cladding; a central core region having a higher refractive index than that of the cladding; a depressed core region which is located around the central core region, and which has a lower refractive index than that of the cladding; and a ring core region which is located around the depressed core region and inside the cladding, and which has a higher refractive index than that of the cladding, wherein, the radius of the ring core region is set in a range from 6.7 μm to 8.7 μm, the radius ratio of the depressed core region relative to the central core region is set in a range from 2.0 to 3.0, and the radius ratio of the ring core region relative to the depressed core region is set in a range from 1.4 to 2.0, wherein the relative refractive index difference of the central core region relative to the cladding is set in a range from +1.40% to +1.80%, the relative refractive index difference of the depressed core region relative to the cladding is set in a range from −1.20% to −1.50%, and the relative refractive index difference of the ring core region relative to the cladding is set in a range from +0.20% to +0.50%, and wherein at least one wavelength selected from the range from 1.53 μm to 1.57 μm, chromatic dispersion of the dispersion compensating fiber is in a range from −40 ps/nm/km to −90 ps/nm/km, the ratio of the dispersion slope relative to the chromatic dispersion is in a range from 0.016 $nm^{-1}$ to 0.024 $nm^{-1}$, and the dispersion compensating fiber has a cut-off wavelength which substantially enables single mode transmission at a use length when it is used in a wound state.

Accordingly, advantageous effects similar to that obtained by the dispersion compensating fiber of the third aspect of the present invention is obtainable.

In the above dispersion compensating fiber, the transmission loss may preferably be equal to or less than 0.7 dB/km, and the bending loss at a diameter of 20 mm at the longest wavelength in the wavelength band selected from 1.53 μm to 1.57 μm may be equal to or less than 40 dB/m.

The transmission loss may preferably be equal to or less than 0.7 dB/km, and the bending loss at a diameter of 20 mm at the longest wavelength in the wavelength band selected from 1.53 μm to 1.57 μm may be equal to or less than 10 dB/m.

The present invention also provides a dispersion compensating fiber module comprising any one of the above dispersion compensating fibers.

In the above dispersion compensating fiber module, the dispersion compensating fiber may be wound around a reel having a cylinder diameter equal to or less than 100 mm, and S-SMF or 1.55 μm band non-zero dispersion shifted optical fibers may be connected to both ends of the dispersion compensating fiber.

In the above dispersion compensating fiber module, the dispersion compensating fiber may be wound around a reel having a cylinder diameter equal to or less than 100 mm, intermediate optical fibers, which can reduce the connection loss by adjusting the mode field diameter, may be connected to both ends of the dispersion compensating fiber, and S-SMF or 1.55 μm band non-zero dispersion shifted optical fibers may be connected to both open ends of the intermediate optical fibers.

Accordingly, the mode field diameter of the optical fibers to be connected can be adjusted, whereby it is possible to reduce the connection loss and to construct a dispersion compensating fiber module which may be compact.

In the above dispersion compensating fiber module, when the intermediate optical fibers are connected between the dispersion compensating fiber and S-SMF, or when the intermediate optical fibers are connected between the dispersion compensating fiber and 1.55 μm band NZ-DSFs, tension along these optical fibers and heat may be applied to each of the connecting portions so that the overall connection losses at both ends of each of the intermediate optical fibers is equal to or less than 1 dB.

The dispersion compensating fiber may preferably be wound around the reel with a controlled tension between 20 g and 50 g.

Accordingly, it is possible to construct a dispersion compensating fiber module in which dislocation of the dispersion compensating fiber can be prevented, and increase of loss and degradation of polarization mode dispersion properties can be prevented.

DETAILED DESCRIPTION OF THE PREFERRED EMBODIMENTS

The preferred embodiments of the present invention will be explained with reference to the accompanying drawings.

Figure 1A:
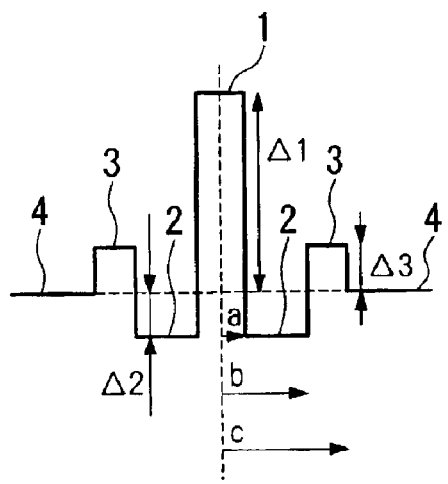
FIGS. 1A to 1C show various refractive index profiles of the dispersion compensating fibers according to the present invention.
Figure 1B:
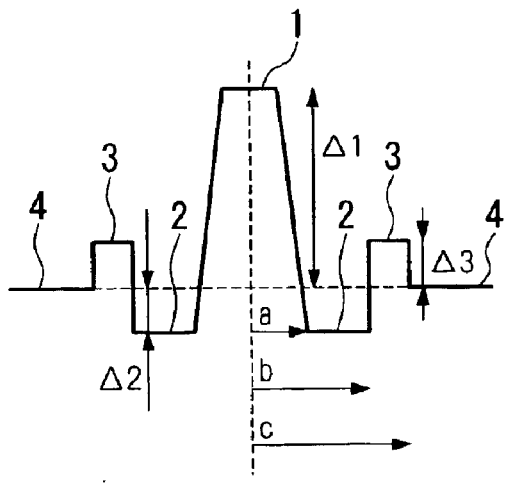
Figure 1C:
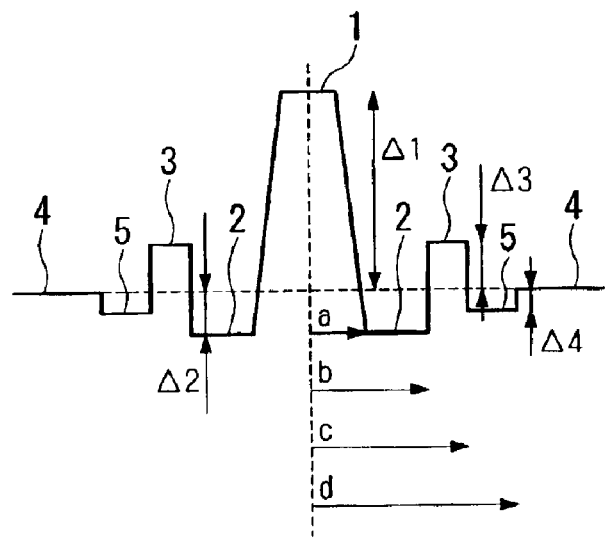

FIGS. 1A to 1C show examples of refractive index profiles of the dispersion compensating fibers according to the present invention.

In FIGS. 1A to 1C, reference numeral 1 indicates a central core region, reference numeral 2 indicates a depressed core region located around the central core region 1, reference numeral 3 indicates a ring core region located around the depressed core region 2, and reference numeral 4 indicates a cladding located around the ring core region 3.

In FIGS. 1A to 1C, reference symbol "a" indicates the radius of the central core 1, reference symbol "b" indicates the radius of the depressed core 2, reference symbol "c" indicates the radius of the ring core 3, reference symbol Δ1 indicates the relative refractive index difference of the central core 1 relative to the cladding 4, reference symbol Δ2 indicates the relative refractive index difference of the depressed core 2 relative to the cladding 4, and reference symbol Δ3 indicates the relative refractive index difference of the ring core 3 relative to the cladding 4.

The central core 1 has a refractive index higher than that of the cladding 4, the depressed core 2 has a refractive index less than that of the cladding 4, and the ring core 3 has a refractive index higher than that of the cladding 4.

FIG. 1C shows an example of a refractive index profile of a dispersion compensating fiber in which a further layer 5 having a refractive index less than that of the cladding 4 is provided between the ring core region 3 and the cladding 4. In FIG. 1C, reference symbol "d" indicates the radius of the further layer, and reference symbol Δ4 indicates the relative refractive index difference of the further layer 5 relative to the cladding 4.

In a first embodiment of the dispersion compensating fiber according to the present invention, the radius of the ring core region 3 is set to be between 6.5 μm and 9.5 μm, the radius ratio b/a of the depressed core region 2 relative to the central core region 1 is set to be between 2.0 and 4.0, the radius ratio c/b of the ring core region 3 relative to the depressed core region 2 is set to be between 1.1 and 2.0, the relative refractive index difference Δ1 of the central core 1 relative to the cladding 4 is set to be between +1.00% and +1.90%, the relative refractive index difference Δ2 of the depressed core 2 relative to the cladding 4 is set to be between −0.60% and −1.00%, and the relative refractive index difference Δ3 of the ring core 3 relative to the cladding 4 is set to be between +0.20% and +1.00%. The radius ratio d/c of the further layer 5 between the ring core region 3 and the cladding 4 relative to the ring core region 3 is preferably set to be between 1.3 and 1.8, and the relative refractive index difference Δ4 of the further layer 5 relative to the cladding 4 is preferably set to be between −0.04% and −0.20%.

By setting the refractive index profile to be as described above, it is possible to manufacture a dispersion compensating fiber in which at at least one wavelength selected from the range from 1.53 μm to 1.63 μm, the chromatic dispersion is in a range from −50 ps/nm/km to −150 ps/nm/km, the dispersion slope is in a range from −0.25 ps/nm$^2$/km to −3.0 ps/nm$^2$/km, and the RDS is in a range from 0.005 nm$^{-1}$ to 0.020 nm$^{-1}$, and which has a cut-off wavelength which substantially enables single mode transmission.

In a second embodiment, the radius of the ring core region 3 is set to be between 6.5 μm and 9.5 μm, the radius ratio b/a of the depressed core region 2 relative to the central core region 1 is set to be between 2.0 and 3.5, the radius ratio c/b of the ring core region 3 relative to the depressed core region 2 is set to be between 1.1 and 1.5, the relative refractive index difference Δ1 of the central core 1 relative to the cladding 4 is set to be between +1.30% and +1.80%, the relative refractive index difference Δ2 of the depressed core 2 relative to the cladding 4 is set to be between −0.68% and −0.75%, and the relative refractive index difference Δ3 of the ring core 3 relative to the cladding 4 is set to be between +0.3% and +0.6%. The radius ratio d/c of the further layer 5 between the ring core region 3 and the cladding 4 relative to the ring core region 3 is preferably set to be between 1.3 and 1.8, and the relative refractive index difference Δ4 of the further layer 5 relative to the cladding 4 is preferably set to be between −0.04% and −0.20%.

By setting the refractive index profile to be as described above, it is possible to manufacture a dispersion compensating fiber in which at at least one wavelength selected from the range from 1.53 μm to 1.63 μm, the chromatic dispersion is in a range from −50 ps/nm/km to −100 ps/nm/km, the dispersion slope is in a range from −0.25 ps/nm$^2$/km to −2.0 ps/nm$^2$/km, and the RDS is in a range from 0.005 nm$^{-1}$ to 0.020 nm$^{-1}$, and which has a cut-off wavelength which substantially enables single mode transmission.

More specific examples of the dispersion compensating fibers according to the present invention will be explained below with reference to FIGS. 1A to 1C.

EXAMPLES A to D

Four examples A to D of the dispersion compensating fibers in each of which the refractive index profile was set as shown in FIG. 1C, and the physical parameters Δ1, Δ2, Δ3, Δ4, b/a, c/b, and d/c were set as shown in TABLE 1, were manufactured using known manufacturing methods, such as the VAD method, the MCVD method, and the PCVD method. Please note that the dispersion compensating fiber D has the refractive index profile shown in FIG. 1B because, in this case, the layer 5 is not provided between the ring core region 3 and the cladding 4 as is shown in TABLE 1 that Δ4=0.

TABLE 1 also shows the optical properties of the dispersion compensating fibers A to D.

TABLE 1

| Symbol | Δ1 (%) | Δ2 (%) | Δ3 (%) | Δ4 (%) | b/a | c/b | d/c | Core diameter (μm) | Wavelength (μm) | $A_{eff}$ (μm$^2$) | Transmission loss (dB/km) | Chromatic dispersion (ps/nm/km) | Dispersion slope (ps/nm$^2$/km) | RDS (nm$^{-1}$) | Bending loss (dB/m) 2R = 20 mm |
|---|---|---|---|---|---|---|---|---|---|---|---|---|---|---|---|
| A | 1.20 | −0.70 | 0.45 | −0.06 | 2.8 | 1.50 | 1.61 | 7.7 | 1.55 | 19 | 0.35 | −98 | −0.86 | 0.0088 | 15 |
| B | 1.45 | −0.70 | 0.40 | −0.06 | 2.6 | 1.45 | 1.61 | 7.6 | 1.55 | 16 | 0.30 | −84 | −0.88 | 0.010 | 23 |
| C | 1.20 | −0.70 | 0.45 | −0.06 | 2.7 | 1.40 | 1.6 | 7.6 | 1.55 | 16 | 0.40 | −54 | −0.86 | 0.016 | 20 |
| D | 1.54 | −0.94 | 0.34 | 0 | 2.6 | 1.77 | — | 7.3 | 1.55 | 15 | 0.38 | −131 | −1.12 | 0.0085 | 3 |

The RDS in the optical fiber A is 0.0088 nm$^{-1}$, the RDS in the optical fiber B is 0.010 nm$^{-1}$, the RDS in the optical fiber C is 0.016 nm$^{-1}$, and the RDS in the optical fiber D is 0.0085 nm$^{-1}$. In these dispersion compensating fibers, the RDSs larger than that in conventional dispersion compensating fibers are obtained even though the absolute values of the chromatic dispersion are relatively large. Accordingly, it is possible to compensate the residual chromatic dispersion over a broad wavelength range in the NZ-DSFs forming optical transmission paths, whereby transmission rate may be increased.

In addition, in any of the optical fibers A to D, the transmission loss is less than 0.5 dB/km. Furthermore, the bending loss at a diameter of 20 mm at the longest wavelength in the wavelength band selected from 1.53 μm to 1.63 μm can be equal to or less than 100 dB/m, and specifically in the case of the optical fibers A and D, the bending loss at a diameter of 20 mm can be equal to or less than 20 dB/m.

EXAMPLES E and F

Two examples E and F of the dispersion compensating fibers in each of which the refractive index profile was set as shown in FIG. 1C, and the physical parameters Δ1, Δ2, Δ3, Δ4, b/a, c/b, and d/c were set as shown in TABLE 2, were manufactured using known manufacturing methods, such as the VAD method, the MCVD method, and the PCVD method.

TABLE 2 also shows the optical properties of the dispersion compensating fibers E and F.

According to the present invention, a dispersion compensating fiber which has a low transmission loss, and in which transmission loss is not increased even when it is wound around a small reel, can be obtained.

In addition, by using the dispersion compensating fibers described above, it is possible to form a dispersion compensating fiber module which may be compact.

In a third embodiment of the dispersion compensating fiber according to the present invention, the radius of the ring core region 3 is set to be between 6.7 μm and 10.7 μm, the radius ratio b/a of the depressed core region 2 relative to the central core region 1 is set to be between 2.0 and 3.0, the radius ratio c/b of the ring core region 3 relative to the depressed core region 2 is set to be between 1.3 and 2.0, the relative refractive index difference Δ1 of the central core 1 relative to the cladding 4 is set to be between +1.00% and +1.80%, the relative refractive index difference Δ2 of the depressed core 2 relative to the cladding 4 is set to be between −1.20% and −1.50%, and the relative refractive index difference Δ3 of the ring core 3 relative to the cladding 4 is set to be between +0.20% and +0.50%.

The radius ratio d/c of the further layer 5 between the ring core region 3 and the cladding 4 relative to the ring core region 3 is preferably set to be between 1.3 and 2.0, and the relative refractive index difference Δ4 of the further layer 5 relative to the cladding 4 is preferably set to be between −0.04% and −0.12%.

By setting the refractive index profile to be as described above, it is possible to manufacture a dispersion compensating fiber in which at at least one wavelength selected from

TABLE 2

| Symbol | Δ1 (%) | Δ2 (%) | Δ3 (%) | Δ4 (%) | b/a | c/b | d/c | Core diameter (μm) | Wavelength (μm) | $A_{eff}$ (μm$^2$) | Transmission loss (dB/km) | Chromatic dispersion (ps/nm/km) | Dispersion slope (ps/nm$^2$/km) | RDS (nm$^{-1}$) | Bending loss (dB/m) 2R = 20 mm |
|---|---|---|---|---|---|---|---|---|---|---|---|---|---|---|---|
| E | 1.80 | −0.70 | 0.40 | −0.10 | 2.5 | 1.46 | 1.61 | 7.3 | 1.59 | 15 | 0.33 | −60 | −0.42 | 0.007 | 6 |
| F | 1.65 | −0.70 | 0.45 | −0.07 | 2.5 | 1.46 | 1.61 | 7.3 | 1.59 | 16 | 0.33 | −60 | −0.66 | 0.011 | 12 |

The RDS in the optical fiber E is 0.007 nm$^{-1}$, and the RDS in the optical fiber F is 0.011 nm$^{-1}$. In these dispersion compensating fibers, the RDSs larger than that in conventional dispersion compensating fibers are obtained even though the absolute values of the chromatic dispersion are relatively large. Accordingly, it is possible to compensate the residual chromatic dispersion over a broad wavelength range in the NZ-DSFs forming optical transmission paths, whereby transmission rate may be increased.

In addition, in any of the optical fibers E and F, the transmission loss is less than 0.5 dB/km. Furthermore, the bending loss at a diameter of 20 mm at the longest wavelength in the wavelength band selected from 1.53 μm to 1.63 μm can be equal to or less than 20 dB/m.

By using the physical parameters in these examples, large absolute values of the dispersion slope can be obtained even though the absolute values of the chromatic dispersion are relatively large, and dispersion compensating fibers with a large RDS can thus be obtained, whereby it is possible to effectively compensate the dispersion slope in NZ-DSF having a chromatic dispersion of approximately a few ps/nm/km in the 1.55 μm band.

Accordingly, it is possible to compensate the residual chromatic dispersion over a broad wavelength range in the NZ-DSFs forming optical transmission paths, whereby transmission rate may be increased.

the range from 1.53 μm to 1.57 μm, the chromatic dispersion is in a range from −20 ps/nm/km to −140 ps/nm/km, and the RDS is in a range from 0.016 nm$^{-1}$ to 0.024 nm$^{-1}$, and which has a cut-off wavelength which substantially enables single mode transmission at a use length when it is used by being wound, for example, around a reel.

Please note that trial-and-error during manufacturing may be required to obtain dispersion compensating fibers with the preferred optical properties described above, even when all physical parameters are set within the above-suggested ranges.

In a fourth embodiment of the dispersion compensating fiber according to the present invention, the radius of the ring core region 3 is set to be between 6.7 μm and 8.7 μm, the radius ratio b/a of the depressed core region 2 relative to the central core region 1 is set to be between 2.0 and 3.0, the radius ratio c/b of the ring core region 3 relative to the depressed core region 2 is set to be between 1.4 and 2.0, the relative refractive index difference Δ1 of the central core 1 relative to the cladding 4 is set to be between +1.30% and +1.60%, the relative refractive index difference Δ2 of the depressed core 2 relative to the cladding 4 is set to be between −1.20% and −1.50%, and the relative refractive index difference Δ3 of the ring core 3 relative to the cladding 4 is set to be between +0.2% and +0.4%.

The radius ratio d/c of the further layer 5 between the ring core region 3 and the cladding 4 relative to the ring core region 3 is preferably set to be between 1.3 and 2.0, and the relative refractive index difference Δ4 of the further layer 5 relative to the cladding 4 is preferably set to be between −0.04% and −0.12%.

By setting the refractive index profile to be as described above, it is possible to manufacture a dispersion compensating fiber in which at at least one wavelength selected from the range from 1.53 μm to 1.57 μm, the chromatic dispersion is in a range from −40 ps/nm/km to −90 ps/nm/km, and the RDS is in a range from 0.016 nm$^{-1}$ to 0.024 nm$^{-1}$, and which has a cut-off wavelength which substantially enables single mode transmission at a use length when it is used by being wound, for example, around a reel.

Please note that trial-and-error during manufacturing may be required to obtain dispersion compensating fibers with the preferred optical properties described above, even when all physical parameters are set within the above-suggested ranges.

Next, an embodiment of the dispersion compensating fiber module according to the present invention will be explained.

The dispersion compensating fiber module according to this embodiment is formed by winding the above-described dispersion compensating fiber around a reel having a cylinder diameter equal to or less than 100 mm, which may be more than 100 mm in some cases, and by connecting S-SMF or NZ-DSFs to both ends of the dispersion compensating fiber.

Intermediate optical fibers may be connected to both ends of the dispersion compensating fiber, and S-SMF or 1.55 μm band NZ-DSFs may be connected to both open ends of the intermediate optical fibers. In such cases, the purpose of using the intermediate optical fibers is to adjust the mode field diameter of optical fibers to be connected so as to reduce the connection loss when the optical fibers are connected. The intermediate optical fibers are preferably optical fibers which has a field pattern similar to that of the dispersion compensating fiber, which can be connected to the dispersion compensating fiber using an arc-fusion splice method with low temperature, and whose bending loss is not degraded even when it is connected using an arc-fusion splice method with high temperature.

When dispersion compensating fibers are connected to S-SMF, or to NZ-DSF via intermediate optical fibers as described above, temperature and time of heating at each connecting portion is preferably controlled, and tension along the optical fibers is preferably applied to each connecting portion during heating. By using such measures, it is possible to suppress overall connection losses at both ends of the intermediate optical fiber to be less than 1 dB.

In the above dispersion compensating fiber module, the dispersion compensating fiber is preferably wound around a reel with a winding tension controlled to be between 20 g and 50 g. This tension range is preferable because, when the tension is less than 20 g, dislocation of the dispersion compensating fiber may occur due to vibration or shock, which could cause unstable characteristics, and when the tension is greater than 50 g, transmission loss may be increased or polarization mode dispersion may be degraded due to side pressure during winding.

Further specific examples of the dispersion compensating fibers according to the present invention will be explained below with reference to FIGS. 1A to 1C.

EXAMPLES G to K

Five examples G to K of the dispersion compensating fibers in each of which the refractive index profile was set as shown in FIG. 1C, and the physical parameters Δ1, Δ2, Δ3, Δ4, b/a, c/b, and d/c were set as shown in TABLE 3, were manufactured using known manufacturing methods, such as the VAD method, the MCVD method, and the PCVD method. Please note that the dispersion compensating fiber L has the refractive index profile shown in FIG. 1B because, in this case, the layer 5 is not provided between the ring core region 3 and the cladding 4 as is shown in TABLE 3 that Δ4=0.

TABLE 3 also shows the optical properties of the dispersion compensating fibers G to K.

TABLE 3

| Symbol | Δ1 (%) | Δ2 (%) | Δ3 (%) | Δ4 (%) | b/a | c/b | d/c | Core diameter (μm) | Wavelength (μm) | $A_{eff}$ (μm$^2$) | Transmission loss (dB/km) | Chromatic dispersion (ps/nm/km) | Dispersion slope (ps/nm$^2$/km) | RDS (nm$^{-1}$) | Bending loss (dB/m) 2R = 20 mm Wavelength = 1.57 μm |
|---|---|---|---|---|---|---|---|---|---|---|---|---|---|---|---|
| G | 1.45 | −1.50 | 0.30 | −0.06 | 2.6 | 1.6 | 1.6 | 7.2 | 1.55 | 12 | 0.38 | −57.5 | −1.16 | 0.0201 | 9 |
| H | 1.10 | −1.20 | 0.20 | −0.06 | 2.4 | 1.8 | 1.6 | 8.6 | 1.55 | 15 | 0.30 | −23.2 | −0.457 | 0.0197 | 8 |
| I | 1.70 | −1.40 | 0.20 | −0.06 | 2.6 | 2.0 | 1.6 | 7.8 | 1.55 | 11 | 0.45 | −138 | −2.64 | 0.0191 | 16 |
| J | 1.80 | −1.30 | 0.30 | 0 | 3.0 | 1.7 | — | 7.2 | 1.55 | 10 | 0.47 | −117 | −2.22 | 0.0190 | 8 |
| K | 1.42 | −1.45 | 0.26 | −0.10 | 2.6 | 1.7 | 1.6 | 7.7 | 1.55 | 12 | 0.35 | −42.6 | −0.814 | 0.0191 | 4 |

The RDS in the optical fiber G is 0.0201 nm$^{-1}$ the RDS in the optical fiber H is 0.0197 nm$^{-1}$, the RDS in the optical fiber I is 0.0191 nm$^{-1}$, the RDS in the optical fiber J is 0.0190 nm$^{-1}$, and the RDS in the optical fiber K is 0.0191 nm$^{-1}$. In these dispersion compensating fibers, the RDSs larger than that in conventional dispersion compensating fibers are obtained even though the absolute values of the chromatic dispersion are relatively large. Accordingly, it is possible to compensate the residual chromatic dispersion over a broad wavelength range in the NZ-DSFs forming optical transmission paths, whereby transmission rate may be increased.

In addition, in any of the optical fibers G to K, the transmission loss is less than 0.7 dB/km. Furthermore, the bending loss at a diameter of 20 mm at the longest wavelength in the wavelength band selected from 1.53 μm to 1.57 μm can be equal to or less than 40 dB/m, and specifically in the case of the optical fibers G, H, J, and K, the bending loss at a diameter of 20 mm can be equal to or less than 10 dB.

In order to form the dispersion compensating fiber modules A to E for NZ-DSF, whose optical properties are shown in TABLE 4, respectively, each of the dispersion compensating fibers G to J shown in TABLE 3 was wound around a small reel having a cylinder diameter of 80 mm with a winding tension of 40 g so as to form a small coil, the intermediate optical fibers were connected to the both ends of the dispersion compensating fiber so that connection loss was reduced, and S-SMFs were connected to both open ends of the intermediate optical fibers so as to form input/output ends. All of the dispersion compensating fiber modules A to E are dispersion compensating fiber modules for compensating dispersion in 100 km long NZ-DSFs.

TABLE 4

| Symbol | Wavelength ($\mu$m) | Module loss (dB) | Module dispersion (ps/nm) | Module dispersion slope (ps/nm$^2$) | RDS (nm$^{-1}$) |
| --- | --- | --- | --- | --- | --- |
| Module A | 1.55 | 3.78 | −450 | −9.05 | 0.0201 |
| Module B | 1.55 | 6.26 | −451 | −8.88 | 0.0197 |
| Module C | 1.55 | 2.32 | −448 | −8.56 | 0.0191 |
| Module D | 1.55 | 2.74 | −450 | −8.55 | 0.0190 |
| Module E | 1.55 | 4.43 | −453 | −8.65 | 0.0191 |

All of the dispersion compensating fiber modules A to E are dispersion compensating fiber modules with low module losses, in which the RDSs are in a range between 0.016 nm$^{-1}$ and 0.024 nm$^{-1}$, increase of module losses due to winding is prevented. Accordingly, it is possible to compensate the residual chromatic dispersion over a broad wavelength range in the NZ-DSFs forming optical transmission paths, whereby transmission rate may be increased.

According to the above examples of dispersion compensating fibers, a large RDS such as within a range between 0.016 nm$^{-1}$ and 0.024 nm$^{-1}$ can be obtained even though the absolute value of the chromatic dispersion is large, and dispersion slope in NZ-DSF having the chromatic dispersion of +4.5 ps/nm/km and the dispersion slope of +0.09 ps/nm$^2$/km in the 1.55 $\mu$m band can effectively be compensated.

Accordingly, it is possible to compensate the residual chromatic dispersion over a broad wavelength range in the NZ-DSFs forming optical transmission paths, whereby transmission rate may be increased so as to form high speed optical transmission paths in which the transmission rate is, for example, 40 Gb/s.

In addition, in the above examples of dispersion compensating fibers, transmission loss is minimized, and increase of transmission loss can be prevented even when the fibers are wound around a small reel.

Furthermore, when a dispersion compensating fiber module is formed by connecting intermediate optical fibers to both ends of the dispersion compensating fiber wound around a reel, and by connecting S-SMFs or NZ-DSFs to both open ends of the intermediate optical fibers, the mode field diameter can be adjusted at each connection point, whereby connection loss can be reduced, and the dispersion compensating fiber module may be compact.

When dispersion compensating fibers are connected to S-SMF, or to NZ-DSF via intermediate optical fibers, and if tension along the optical fibers is applied to each connecting portion, it is possible to suppress overall connection losses at both ends of the intermediate optical fibers to be less than 1 dB, whereby a dispersion compensating fiber module with a low module loss can be obtained.

In addition, by controlling the winding tension to be between 20 g and 50 g when the dispersion compensating fiber is wound around a reel, a dispersion compensating fiber module can be obtained, in which dislocation of the dispersion compensating fiber due to vibration or shock can be prevented, and also increase of module loss and degradation of polarization mode dispersion properties can be prevented.

As explained above, according to the first aspect of the present invention, large absolute values of the dispersion slope can be obtained even though the absolute values of the chromatic dispersion are relatively large, and dispersion compensating fibers with a large RDS can thus be obtained, whereby it is possible to effectively compensate dispersion slope in NZ-DSF having a chromatic dispersion of approximately a few ps/nm/km in the 1.55 $\mu$m band.

Accordingly, it is possible to compensate the residual chromatic dispersion over a broad wavelength range in the NZ-DSFs forming optical transmission paths, whereby transmission rate may be increased.

According to another aspect of the present invention, a dispersion compensating fiber which has a low transmission loss, and in which transmission loss is not increased even when it is wound around a small reel, can be obtained.

In addition, by using the dispersion compensating fibers described above, it is possible to form a dispersion compensating fiber module which may be compact.

According to another aspect of the present invention, by setting the radius of the ring core region to be in a range from 6.7 $\mu$m to 10.7 $\mu$m, the radius ratio of the depressed core region relative to the central core region to be in a range from 2.0 to 3.0, the radius ratio of the ring core region relative to the depressed core region to be in a range from 1.3 to 2.0, the relative refractive index difference of the central core region relative to the cladding to be in a range from +1.00% to +1.80%, the relative refractive index difference of the depressed core region relative to the cladding to be in a range from −1.20% to −1.50%, and the relative refractive index difference of the ring core region relative to the cladding to be in a range from +0.20% to +0.50%, a dispersion compensating fiber can be obtained in which at at least one wavelength selected from the range from 1.53 $\mu$m to 1.57 $\mu$m, the chromatic dispersion is in a range from −20 ps/nm/km to −140 ps/nm/km, the ratio of the dispersion slope relative to the chromatic dispersion is in a range from 0.016 nm$^{-1}$ to 0.024 nm$^{-1}$. In this case, the dispersion compensating fiber could have a cut-off wavelength which substantially enables single mode transmission at a use length when it is used in a wound state, and in which a large RDS could be obtained even though the absolute value of the chromatic dispersion is relatively large.

Accordingly, it is possible to obtain a dispersion compensating fiber which can effectively compensate the dispersion slope even for the NZ-DSF having the chromatic dispersion of about +4.5 ps/nm/km and the dispersion slope of about +0.09 ps/nm$^2$/km in the 1.55 $\mu$m band.

Furthermore, it is possible to compensate the residual chromatic dispersion over a broad wavelength range, whereby transmission rate may be increased, and high speed optical transmission paths in which the transmission rate is, for example, 40 Gb/s, can be constructed.

In addition, a dispersion compensating fiber which has a low transmission loss, and in which transmission loss is not increased even when it is wound around a small reel, can be obtained.

The advantageous effects described above can also be obtained by providing a dispersion compensating fiber in which the radius of the ring core region is set in a range from 6.7 $\mu$m to 8.7 $\mu$m, the radius ratio of the depressed core region relative to the central core region is set in a range from 2.0 to 3.0, the radius ratio of the ring core region relative to the depressed core region is set in a range from 1.4 to 2.0, the relative refractive index difference of the central core region relative to the cladding is set in a range from +1.40% to +1.80%, the relative refractive index difference of the depressed core region relative to the cladding is set in a range from −1.20% to −1.50%, and the relative refractive index difference of the ring core region relative to the cladding is set in a range from +0.20% to +0.50%, and in which at at least one wavelength selected from the range from 1.53 μm to 1.57 μm, chromatic dispersion of the dispersion compensating fiber is in a range from 40 ps/nm/km to −90 ps/nm/km, the ratio of the dispersion slope relative to the chromatic dispersion is in a range from 0.016 nm$^{-1}$ to 0.024 nm$^{-1}$, and which has a cut-off wavelength which substantially enables single mode transmission at a use length when it is used in a wound state.

According to another aspect of the present invention, when a dispersion compensating fiber module is formed by connecting intermediate optical fibers to both ends of the dispersion compensating fiber wound around a reel, and by connecting S-SMFs or NZ-DSFs to both open ends of the intermediate optical fibers, the mode field diameter can be adjusted at each connection point, whereby connection loss can be reduced, and the dispersion compensating fiber module may be compact.

In addition, when dispersion compensating fibers are connected to S-SMF, or to NZ-DSF via intermediate optical fibers, and if tension along the optical fibers is applied to each connecting portion, it is possible to suppress overall connection losses at both ends of the intermediate optical fibers to be less than 1 dB, whereby a dispersion compensating fiber module with a low module loss can be obtained.

Furthermore, by controlling the winding tension to be between 20 g and 50 g when the dispersion compensating fiber is wound around a reel, a dispersion compensating fiber module can be obtained, in which dislocation of the dispersion compensating fiber due to vibration or shock can be prevented, and also increase of module loss and degradation of polarization mode dispersion properties can be prevented.

What is claimed is:

1. A dispersion compensating fiber, comprising:
a cladding;
a central core region having a higher refractive index than that of said cladding;
a depressed core region which is located around said central core region, and which has a lower refractive index than that of said cladding; and
a ring core region which is located around said depressed core region and inside said cladding, and which has a higher refractive index than that of said cladding,
wherein the radius of said ring core region is set in a range from 6.5 μm to 9.5 μm, the radius ratio of said depressed core region relative to said central core region is set in a range from 2.0 to 4.0, and the radius ratio of said ring core region relative to said depressed core region is set in a range from 1.1 to 2.0,
wherein the relative refractive index difference of said central core region relative to said cladding is set in a range from +1.00% to +1.90%, the relative refractive index difference of said depressed core region relative to said cladding is set in a range from −0.60% to −1.00%, and the relative refractive index difference of said ring core region relative to said cladding is set in a range from +0.20% to +1.00%, and
wherein at least one wavelength selected from the range from 1.53 μm to 1.63 μm, chromatic dispersion of said dispersion compensating fiber is in a range from −50 ps/nm/km to −150 ps/nm/km, the dispersion slope is in a range from −0.25 ps/nm²/km to −3.0 ps/nm²/km, the ratio of the dispersion slope relative to the chromatic dispersion is in a range from 0.005 nm$^{-1}$ to 0.020 nm$^{-1}$, and said dispersion compensating fiber has a cut-off wavelength which substantially enables single mode transmission.

2. A dispersion compensating fiber according to claim 1, wherein
the transmission loss is not more than 0.5 dB/km, and the bending loss at a diameter of 20 mm at the longest wavelength in the wavelength band selected from 1.53 μm to 1.63 μm is not more than 100 dB/km.

3. A dispersion compensating fiber according to claim 1, wherein
the transmission loss is not more than 0.5 dB/km, and the bending loss at a diameter of 20 mm at the longest wavelength in the wavelength band selected from 1.53 μto 1.63 μm is not more than 20 dB/m.

4. A dispersion compensating fiber according to claim 6, further comprising
a layer which is located between said ring core region and said cladding, and which has a lower refractive index than that of said cladding.

5. A dispersion compensating fiber module comprising a dispersion compensating fiber according claim 1.

6. A dispersion compensating fiber, comprising:
a cladding;
a central core region having a higher refractive index than that of said cladding;
a depressed core region which is located around said central core region, and which has a lower refractive index than that of said cladding; and
a ring core region which is located around said depressed core region and inside said cladding, and which has a higher refractive index than that of said cladding,
wherein the radius of said ring core region is set in a range from 6.5 μm to 9.5 μm, the radius ratio of said depressed core region relative to said central core region is set in a range from 2.0 to 3.5, and the radius ratio of said ring core region relative to said depressed core region is set in a range from 1.1 to 1.5,
wherein the relative refractive index difference of said central core region relative to said cladding is set in a range from +1.30% to +1.80%, the relative refractive index difference of said depressed core region relative to said cladding is set in a range from −0.68% to −0.75%, and the relative refractive index difference of said ring core region relative to said cladding is set in a range from +0.3% to +0.6%, and
wherein at least one wavelength selected from the range from 1.53 μm to 1.63 μm, chromatic dispersion of said dispersion compensating fiber is in a range from −50 ps/nm/km to −100 ps/nm/km, the dispersion slope is in a range from −0.25 ps/nm²/km to −2.0 ps/nm²/km, the ratio of the dispersion slope relative to the chromatic dispersion is in a range from 0.005 nm$^{-1}$ to 0.020 nm$^{-1}$, and said dispersion compensating fiber has a cut-off wavelength which substantially enables single mode transmission.

7. A dispersion compensating fiber according to claim 6, wherein
the transmission loss is not more than 0.5 dB/km, and the bending loss at a diameter of 20 mm at the longest wavelength in the wavelength band selected from 1.53 μm to 1.63 μis not more than 100 dB/m.

8. A dispersion compensating fiber according to claim 6, wherein the transmission loss is not more than 0.5 dB/km, and the bending loss at a diameter of 20 mm at the longest wavelength in the wavelength band selected from 1.53 µm to 1.63 µm is not more than 20 dB/m.

9. A dispersion compensating fiber according to claim 6, wherein at least one wavelength selected from the range from 1.53 µm to 1.63 µm, the ratio of the dispersion slope relative to the chromatic dispersion is in a range from 0.010 nm$^{-1}$ to 0.020 nm$^{-1}$, said dispersion compensating fiber has a cut-off wavelength which substantially enables single mode transmission, the transmission loss is not more than 0.5 dB/km, and the bending loss at a diameter of 20 mm at the longest wavelength in the wavelength band selected from 1.53 µm to 1.63 µm is not more than 100 dB/m.

10. A dispersion compensating fiber according to claim 6, further comprising a layer which is located between said ring core region and said cladding, and which has a lower refractive index than that of said cladding.

11. A dispersion compensating fiber module comprising a dispersion compensating fiber according claim 6.

12. A dispersion compensating fiber, comprising:

a cladding;

a central core region having a higher refractive index than that of said cladding;

a depressed core region which is located around said central core region, and which has a lower refractive index than that of said cladding; and a ring core region which is located around said depressed core region and inside said cladding, and which has a higher refractive index than that of said cladding, wherein the radius of said ring core region is set in a range from 6.7 µm to 10.7 µm, the radius ratio of said depressed core region relative to said central core region is set in a range from 2.0 to 3.0, and the radius ratio of said ring core region relative to said depressed core region is set in a range from 1.3 to 2.0, wherein the relative refractive index difference of said central core region relative to said cladding is set in a range from +1.00% to +1.80%, the relative refractive index difference of said depressed core region relative to said cladding is set in a range from −1.20% to −1.50%, and the relative refractive index difference of said ring core region relative to said cladding is set in a range from +0.20% to +0.50%, and wherein at least one wavelength selected from the range from 1.53 µm to 1.57 µm, chromatic dispersion of said dispersion compensating fiber is in a range from −20 ps/mn/km to −140 ps/nm/km, the ratio of the dispersion slope relative to the chromatic dispersion is in a range from 0.016 nm$^{-1}$ to 0.024 nm$^{-1}$, and said dispersion compensating fiber has a cut-off wavelength which substantially enables single mode transmission.

13. A dispersion compensating fiber according to claim 12, wherein the transmission loss is not more than 0.7 dB/km, and the bending loss at a diameter of 20 mm at the longest wavelength in the wavelength band selected from 1.53 µm to 1.57 µm is not more than 40 dB/m.

14. A dispersion compensating fiber according to claim 12, wherein the transmission loss is not more than 0.7 dB/km, and the bending loss at a diameter of 20 mm at the longest wavelength in the wavelength band selected from 1.53 µm to 1.57 µm is not more than 10 dB/m.

15. A dispersion compensating fiber module comprising a dispersion compensating fiber according to claim 12.

16. A dispersion compensating fiber module according to claim 15, further comprising:

two standard single-mode optical fibers with zero-dispersion wavelength in the 1.3 µm band, one of which is connected to an end of said dispersion compensating fiber and the other of which is connected to the other end of said dispersion compensating fiber, wherein said dispersion compensating fiber is wound around a reel having a cylinder diameter of not more than 100 mm.

17. A dispersion compensating fiber module according to claim 15, further comprising:

two intermediate optical fibers for reducing connection loss by adjusting the mode field diameter, one of which is connected to an end of said dispersion compensating fiber and the other of which is connected to the other end of said dispersion compensating fiber; and two standard single-mode optical fibers with zero-dispersion wavelength in the 1.3 µm band, one of which is connected to an end of one of said intermediate optical fibers and the other of which is connected to an end of the other of said intermediate optical fibers, wherein said dispersion compensating fiber is wound around a reel having a cylinder diameter of not more than 100 mm.

18. A dispersion compensating fiber module according to claim 17, wherein when said two intermediate optical fibers are connected between said dispersion compensating fiber and said two standard single-mode optical fibers with zero-dispersion wavelength in the 1.3 µm band, respectively, tension and heat are applied to each of the connecting portions of the optical fibers so that the total of the connection losses at both ends of each of said two intermediate optical fibers is not more than 1 dB.

19. A dispersion compensating fiber module according to claim 16, wherein said dispersion compensating fiber is wound around said reel with a controlled tension between 20 g and 50 g.

20. A dispersion compensating fiber module according to claim 17, wherein said dispersion compensating fiber is wound around said reel with a controlled tension between 20 g and 50 g.

21. A dispersion compensating fiber module according to claim 15, further comprising:

two 1.55 µm band non-zero dispersion shifted optical fibers, one of which is connected to an end of said dispersion compensating fiber and the other of which is connected to the other end of said dispersion compensating fiber, wherein said dispersion compensating fiber is wound around a reel having a cylinder diameter of not more than 100 mm.

22. A dispersion compensating fiber module according to claim 15, further comprising:

two intermediate optical fibers for reducing connection loss by adjusting the mode field diameter, one of which is connected to an end of said dispersion compensating fiber and the other of which is connected to the other end of said dispersion compensating fiber; and two 1.55 µm band non-zero dispersion shifted optical fibers, one of which is connected to an end of one of said intermediate optical fibers and the other of which is connected to an end of the other of said intermediate optical fibers, wherein said dispersion compensating fiber is wound around a reel having a cylinder diameter of not more than 100 mm.

23. A dispersion compensating fiber module according to claim 17, wherein when said two intermediate optical fibers are connected between said dispersion compensating fiber and said two 1.55 μm band non-zero dispersion shifted optical fibers, respectively, tension and heat are applied to each of the connecting portions of the optical fibers so that the total of the connection losses at both ends of each of said two intermediate optical fibers is of not more than 1 dB.

24. A dispersion compensating fiber module according to claim 22, wherein when said two intermediate optical fibers are connected between said dispersion compensating fiber and said two 1.55 μm band non-zero dispersion shifted optical fibers, respectively, tension and heat are applied to each of the connecting portions of the optical fibers so that the total of the connection losses at both ends of each of said two intermediate optical fibers is of not more than 1 dB.

25. A dispersion compensating fiber module according to claim 21, wherein said dispersion compensating fiber is wound around said reel with a controlled tension between 20 g and 50 g.

26. A dispersion compensating fiber module according to claim 22, wherein said dispersion compensating fiber is wound around said reel with a controlled tension between 20 g and 50 g.

27. A dispersion compensating fiber, comprising:

a cladding;

a central core region having a higher refractive index than that of said cladding;

a depressed core region which is located around said central core region, and which has a lower refractive index than that of said cladding; and a ring core region which is located around said depressed core region and inside said cladding, and which has a higher refractive index than that of said cladding, wherein the radius of said ring core region is set in a range from 6.7 μm to 8.7 μm, the radius ratio of said depressed core region relative to said central core region is set in a range from 2.0 to 3.0, and the radius ratio of said ring core region relative to said depressed core region is set in a range from 1.4 to 2.0, wherein the relative refractive index difference of said central core region relative to said cladding is set in a range from +1.40% to +1.80%, the relative refractive index difference of said depressed care region relative to said cladding is set in a range from −1.20% to −1.50%, and the relative refractive index difference of said ring core region relative to said cladding is set in a range from +0.20% to +0.50%, and wherein at least one wavelength selected from the range from 1.53 μm to 1.57 μm, chromatic dispersion of said dispersion compensating fiber is in a range from −40 ps/nm/km to −90 ps/nm/km the ratio of the dispersion slope relative to the chromatic dispersion is in a range from 0.016 nm$^{-1}$ to 0.024 nm$^{-1}$, and said dispersion compensating fiber as a cut-off wavelength which substantially enables single mode transmission.

28. A dispersion compensating fiber according to claim 27, wherein the transmission loss is not more than 0.7 dB/km, and the bending loss at a diameter of 20 mm at the longest wavelength in the wavelength band selected from 1.53 μm to 1.57 μm is not more than 40 dB/m.

29. A dispersion compensating fiber according to claim 27, wherein the transmission loss is not more than 0.7 dB/km, and the bending loss at a diameter of 20 mm at the longest wavelength in the wavelength band selected from 1.53 μm to 1.57 μm is not more than 10 dB/m.

30. A dispersion compensating fiber module comprising a dispersion compensating fiber according to claim 27.

31. A dispersion compensating fiber module according to claim 30, further comprising:

two standard single-mode optical fibers with zero-dispersion wavelength in the 1.3 μm band, one of which is connected to an end of said dispersion compensating fiber and the other of which is connected to the other end of said dispersion compensating fiber, wherein said dispersion compensating fiber is wound around a reel having a cylinder diameter of not more than 100 mm.

32. A dispersion compensating fiber module according to claim 30, further comprising:

two intermediate optical fibers for reducing connection loss by adjusting the mode field diameter, one of which is connected to an end of said dispersion compensating fiber and the other of which is connected to the other end of said dispersion compensating fiber; and two standard single-mode optical fibers with zero-dispersion wavelength in the 1.3 μm band, one of which is connected to an end of one of said intermediate optical fibers and the other of which is connected to an end of the other of said intermediate optical fibers, wherein said dispersion compensating fiber is wound around a reel having a cylinder diameter of not more than 100 mm.

33. A dispersion compensating fiber module according to claim 32, wherein when said two intermediate optical fibers are connected between said dispersion compensating fiber and said two standard single-mode optical fibers with zero-dispersion wavelength in the 1.3 μm band, tension and heat are applied to each of the connecting portions of the optical fibers so that the total of the connection losses at both ends of each of said two intermediate optical fibers is not more than 1 dB.

34. A dispersion compensating fiber module according to claim 31, wherein said dispersion compensating fiber is wound around said reel with a controlled tension between 20 g and 50 g.

35. A dispersion compensating fiber module according to claim 32, wherein said dispersion compensating fiber is wound around said reel with a controlled tension between 20 g and 50 g.

36. A dispersion compensating fiber module according to claim 30, further comprising:

two 1.55 μm band non-zero dispersion shifted optical fibers, one of which is connected to an end of said dispersion compensating fiber and the other of which is connected to the other end of said dispersion compensating fiber, wherein said dispersion compensating fiber is wound around a reel having a cylinder diameter of not more than 100 mm.

37. A dispersion compensating fiber module according to claim 30, further comprising:

two intermediate optical fibers for reducing connection loss by adjusting the mode field diameter, one of which is connected to an end of said dispersion compensating fiber and the other of which is connected to the other end of said dispersion compensating fiber; and two 1.55 μm band non-zero dispersion shifted optical fibers, one of which is connected to an end of one of said intermediate optical fibers and the other of which is connected to an end of the other of said intermediate optical fibers, wherein said dispersion compensating fiber is wound around a reel having a cylinder diameter of not more than 100 mm.

38. A dispersion compensating fiber module according to claim 32, wherein when said two intermediate optical fibers are connected between said dispersion compensating fiber and said two 1.55 μm band non-zero dispersion shifted optical fibers, respectively, tension and heat are applied to each of the connecting portions of the optical fibers so that the total of the connection losses at both ends of each of said two intermediate optical fibers is of not more than 1 dB.

39. A dispersion compensating fiber module according to claim 37, wherein when said two intermediate optical fibers are connected between said dispersion compensating fiber and said two 1.55 μm band non-zero dispersion shifted optical fibers, respectively, tension and heat are applied to each of the connecting portions of the optical fibers so that the total of the connection losses at both ends of each of said two intermediate optical fibers is of not more than 1 dB.

40. A dispersion compensating fiber module according to claim 36, wherein said dispersion compensating fiber is wound around said reel with a controlled tension between 20 g and 50 g.

41. A dispersion compensating fiber module according to claim 37, wherein said dispersion compensating fiber is wound around said reel with a controlled tension between 20 g and 50 g.

* * * * *